United States Patent [19]
Carlson et al.

[11] Patent Number: 5,806,370
[45] Date of Patent: Sep. 15, 1998

[54] METHOD FOR MODIFYING THE SHIFTPOINTS OF AN AUTOMATIC TRANSMISSION

[75] Inventors: Douglas A. Carlson, Morton; Todd D. Creger, Metamora; Jeffery L. Scott, Peoria, all of Ill.

[73] Assignee: Caterpillar Inc., Peoria, Ill.

[21] Appl. No.: 748,442

[22] Filed: Nov. 13, 1996

[51] Int. Cl.⁶ ............................................. F16H 59/00
[52] U.S. Cl. .......................... 74/335; 477/78; 477/906
[58] Field of Search ............... 477/78, 906; 174/336 R, 174/337, 335; 701/51, 55

[56] References Cited

U.S. PATENT DOCUMENTS

| | | |
|---|---|---|
| 4,220,058 | 9/1980 | Petzold . |
| 4,790,418 | 12/1988 | Brown et al. . |
| 4,943,921 | 7/1990 | Baltusis et al. ............................ 477/97 |
| 5,016,175 | 5/1991 | Baltusis et al. ............................ 701/58 |
| 5,166,879 | 11/1992 | Greene et al. ............................ 701/62 |
| 5,235,876 | 8/1993 | Minowa et al. ........................... 74/886 |
| 5,282,401 | 2/1994 | Hebbale et al. . |
| 5,459,658 | 10/1995 | Morey et al. . |
| 5,505,100 | 4/1996 | Mitchell et al. ........................... 74/335 |
| 5,568,748 | 10/1996 | Carlson et al. ............................ 74/336 |
| 5,609,548 | 3/1997 | White et al. ......................... 477/906 X |

Primary Examiner—Rodney H. Bonck
Assistant Examiner—Peter T. Kwon
Attorney, Agent, or Firm—David M. Masterson

[57] ABSTRACT

In one aspect of the present invention, a method of effecting shifts in a vehicle is disclosed. The method modifies the transmission shiftpoints in response to the number of upshift successes and failures.

15 Claims, 7 Drawing Sheets

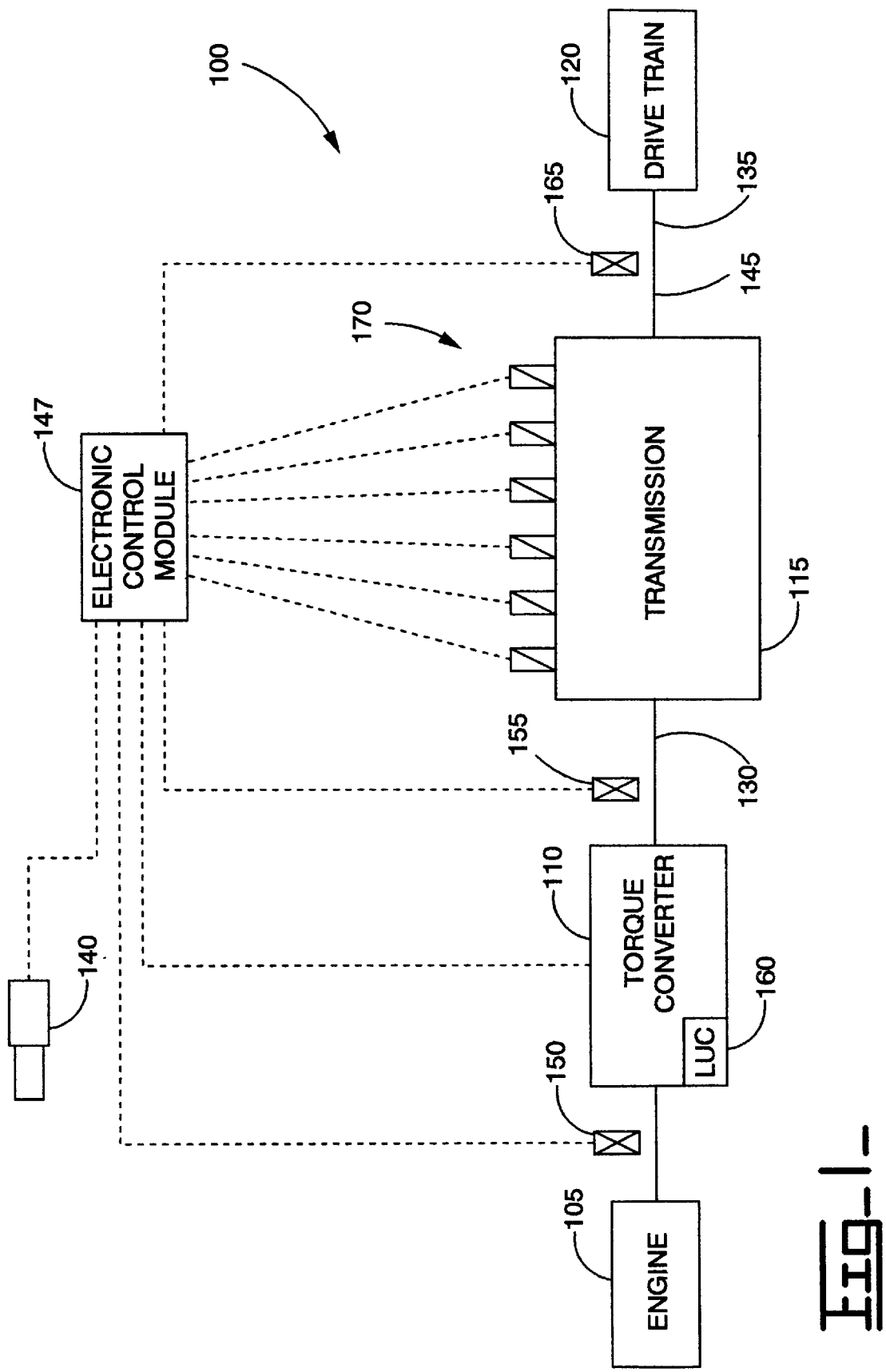

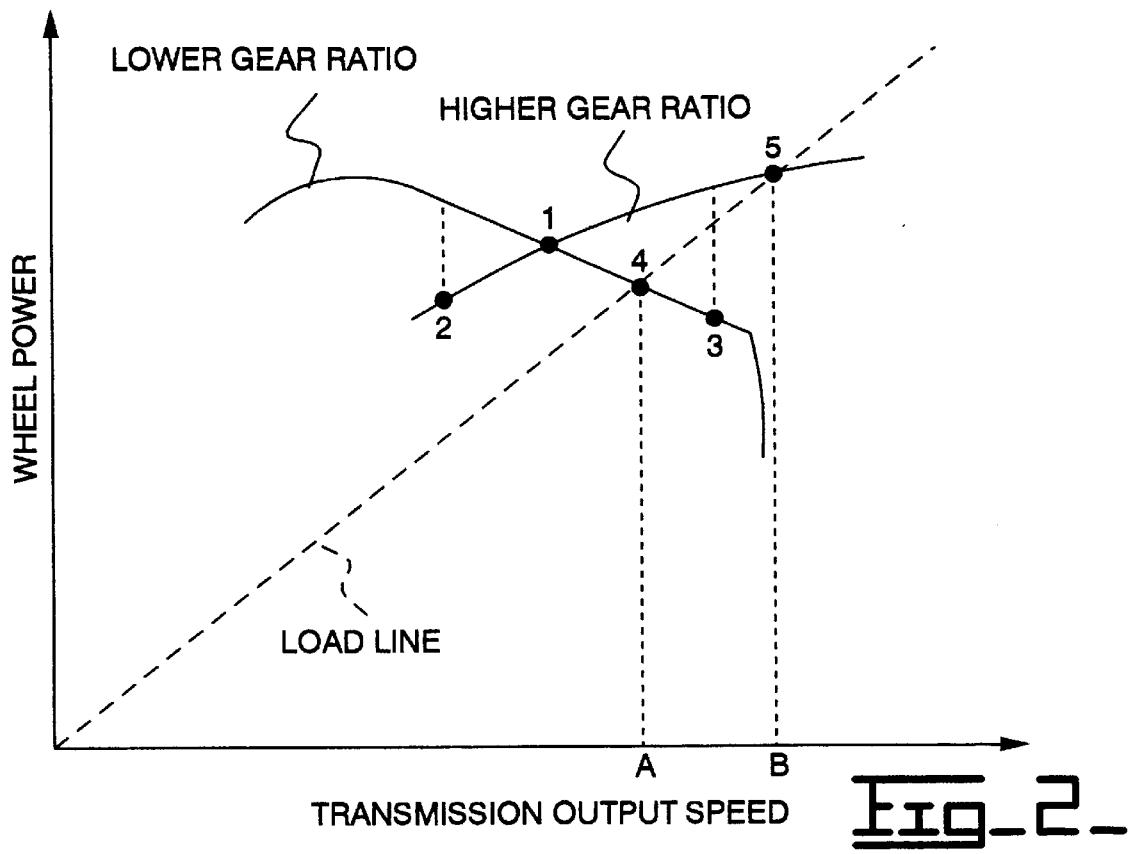
Fig_2_
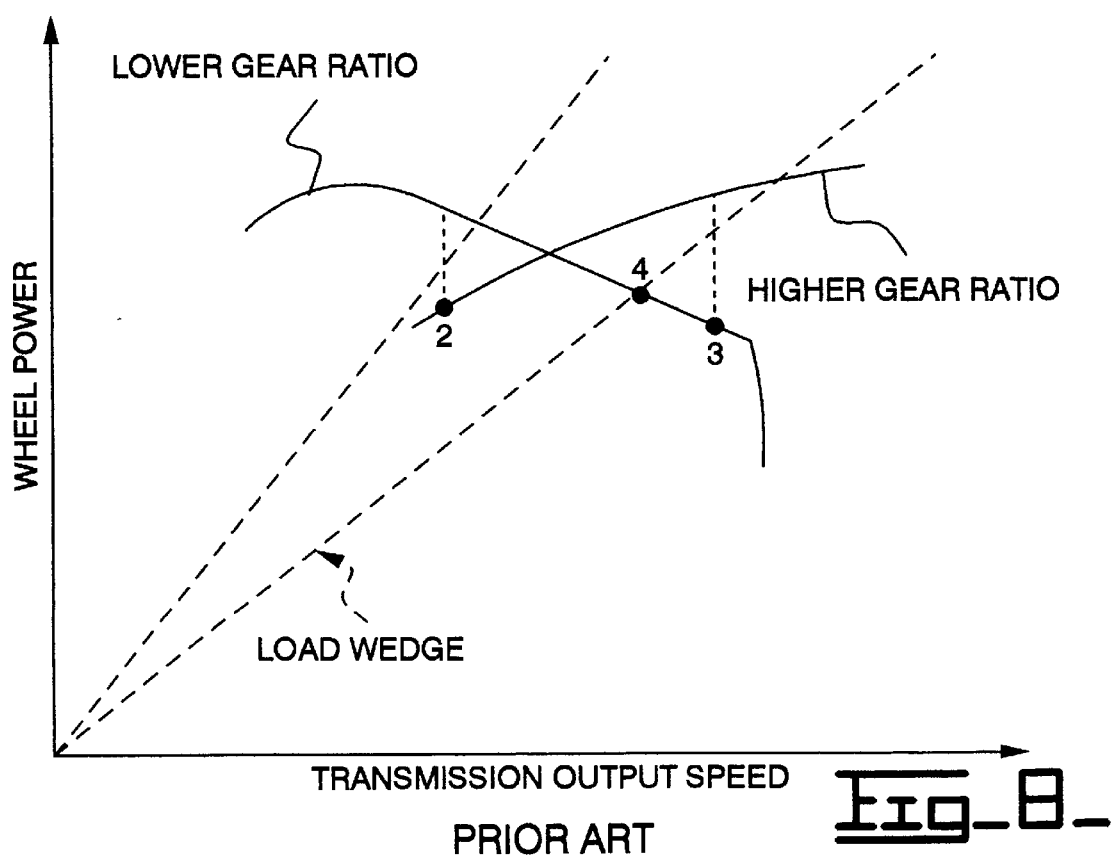
PRIOR ART
Fig_8_

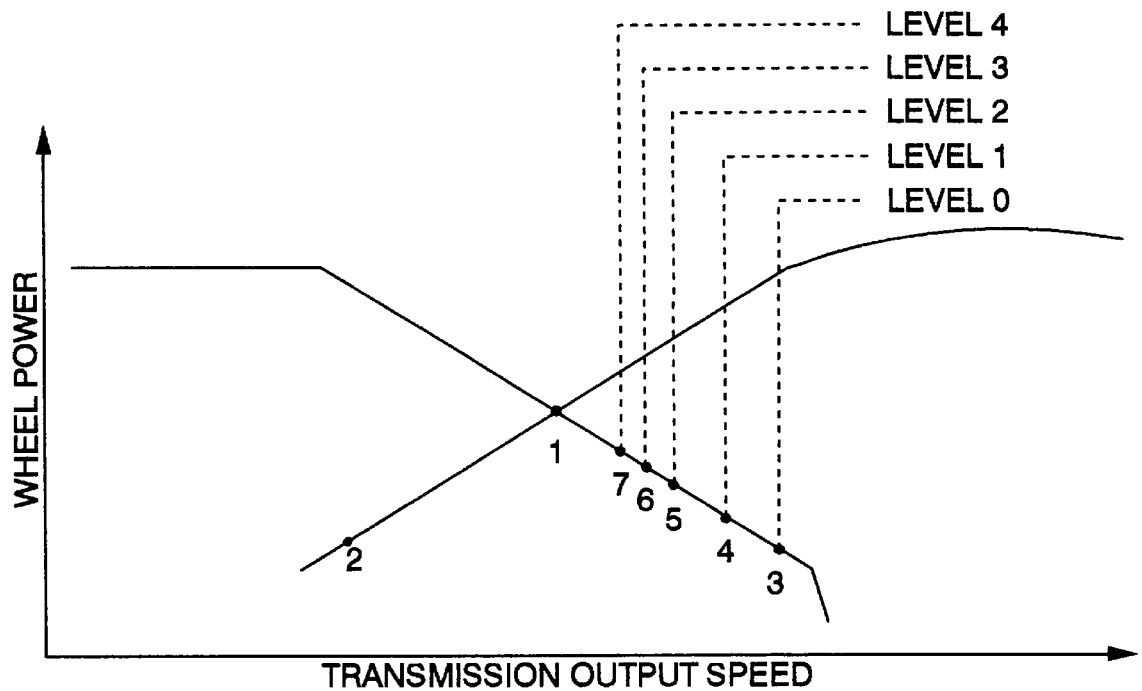
Fig_3_
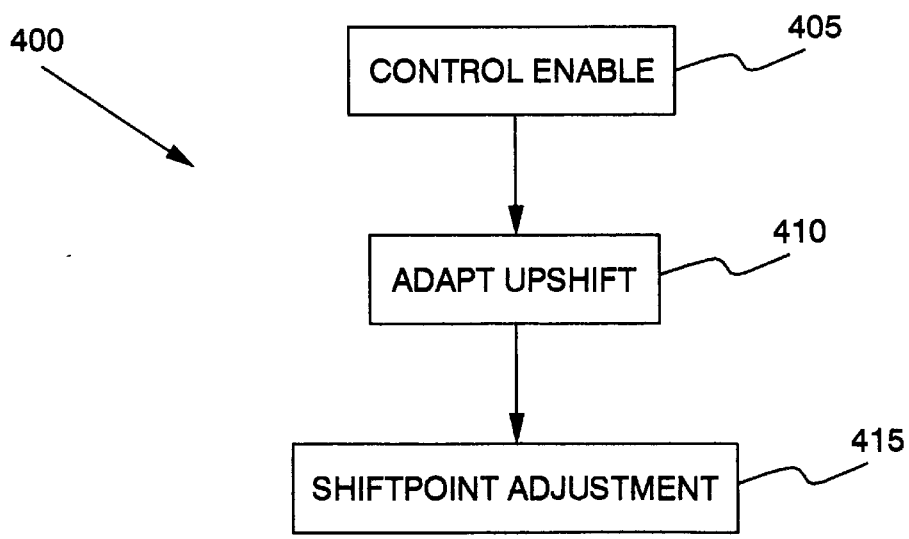
Fig_4_

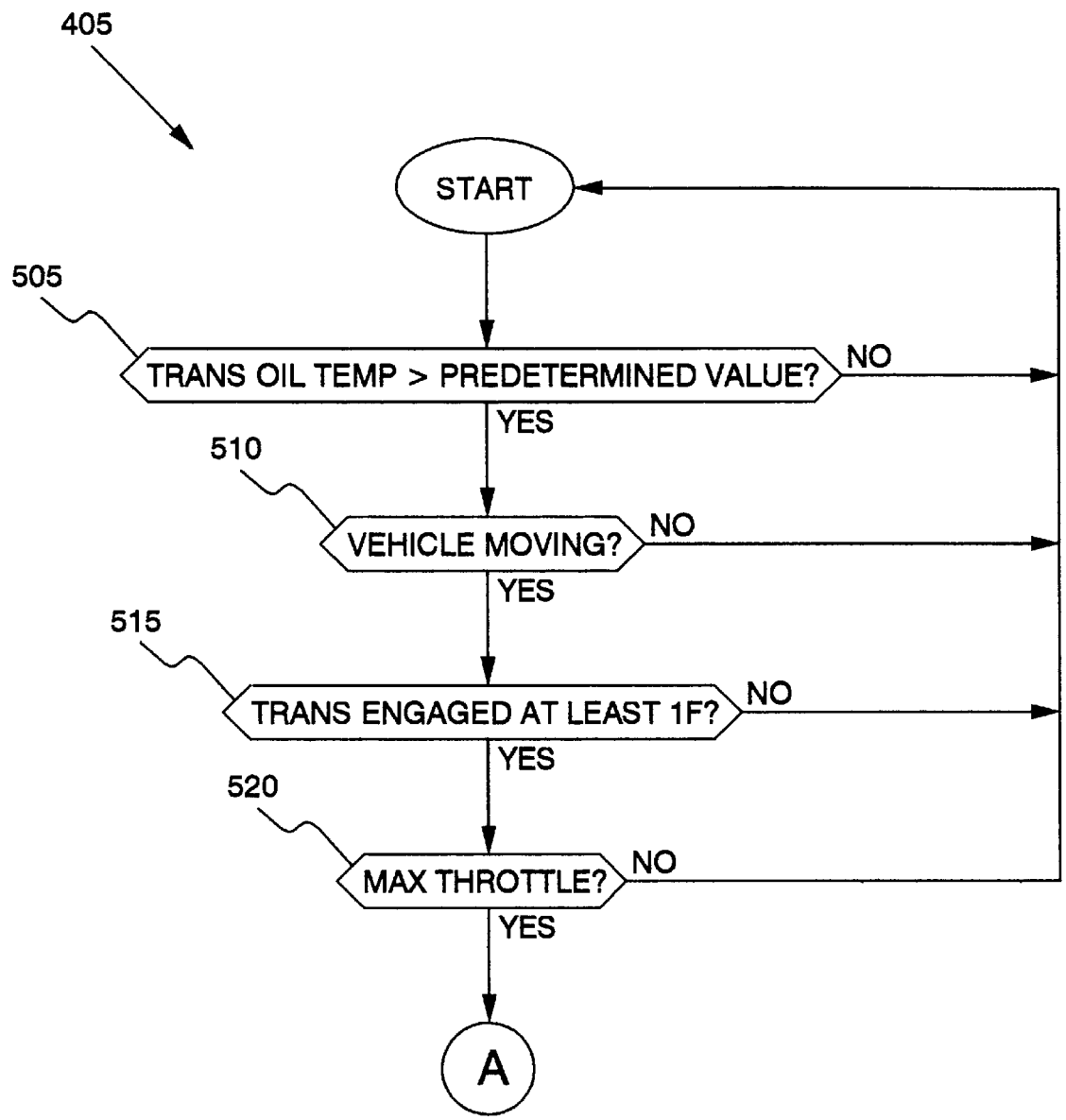
Fig_5_

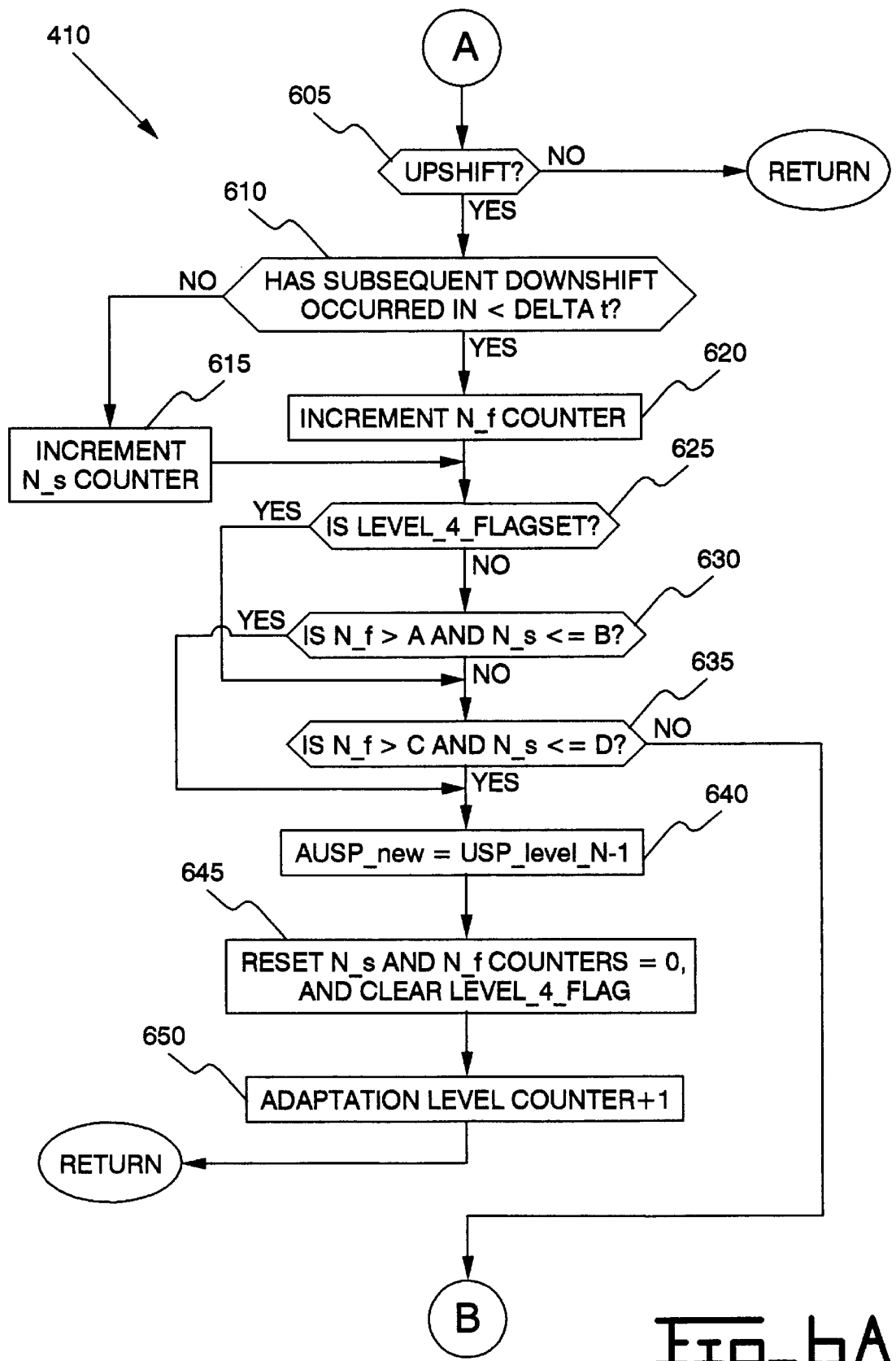
Fig_6A_

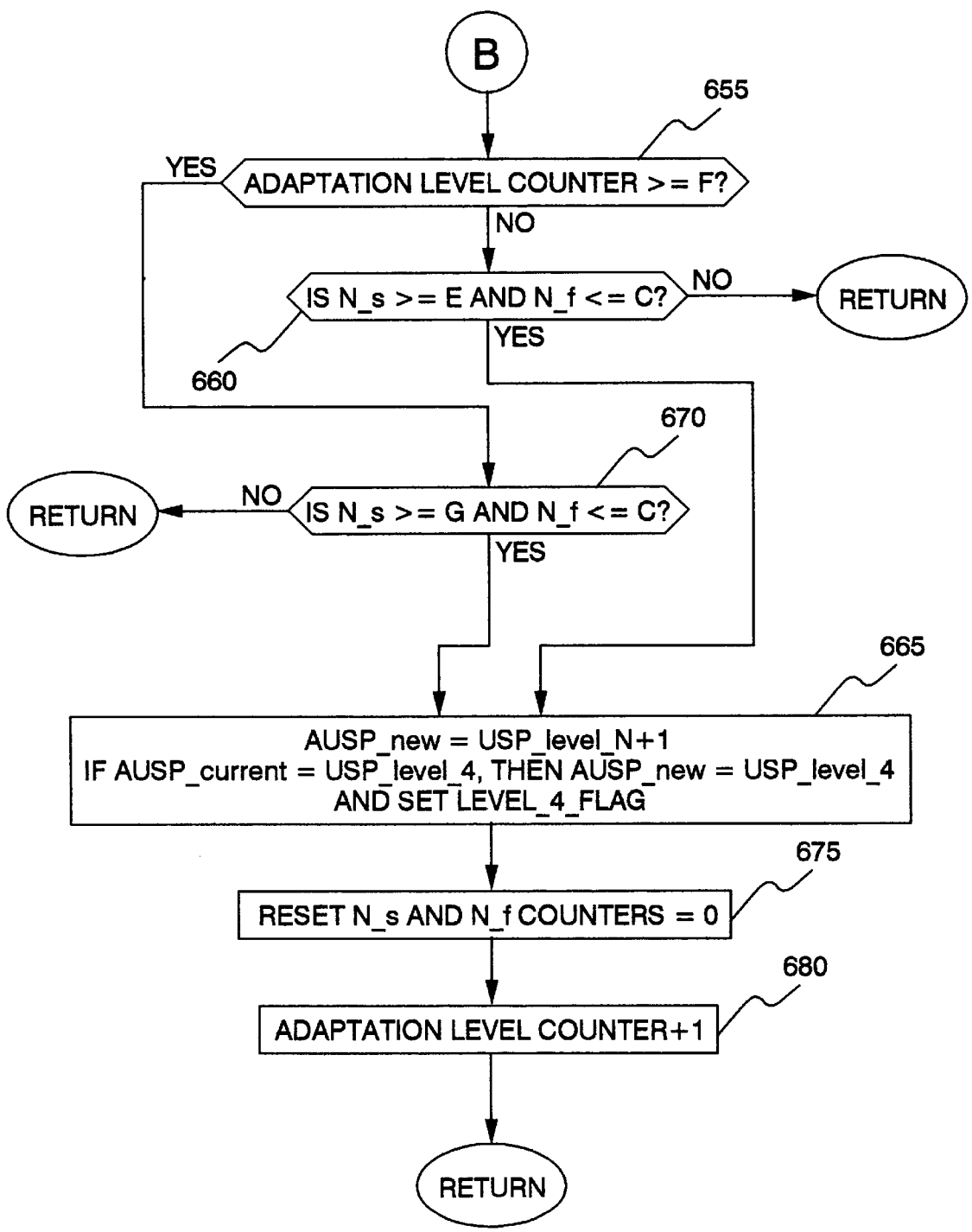
Fig_6B_

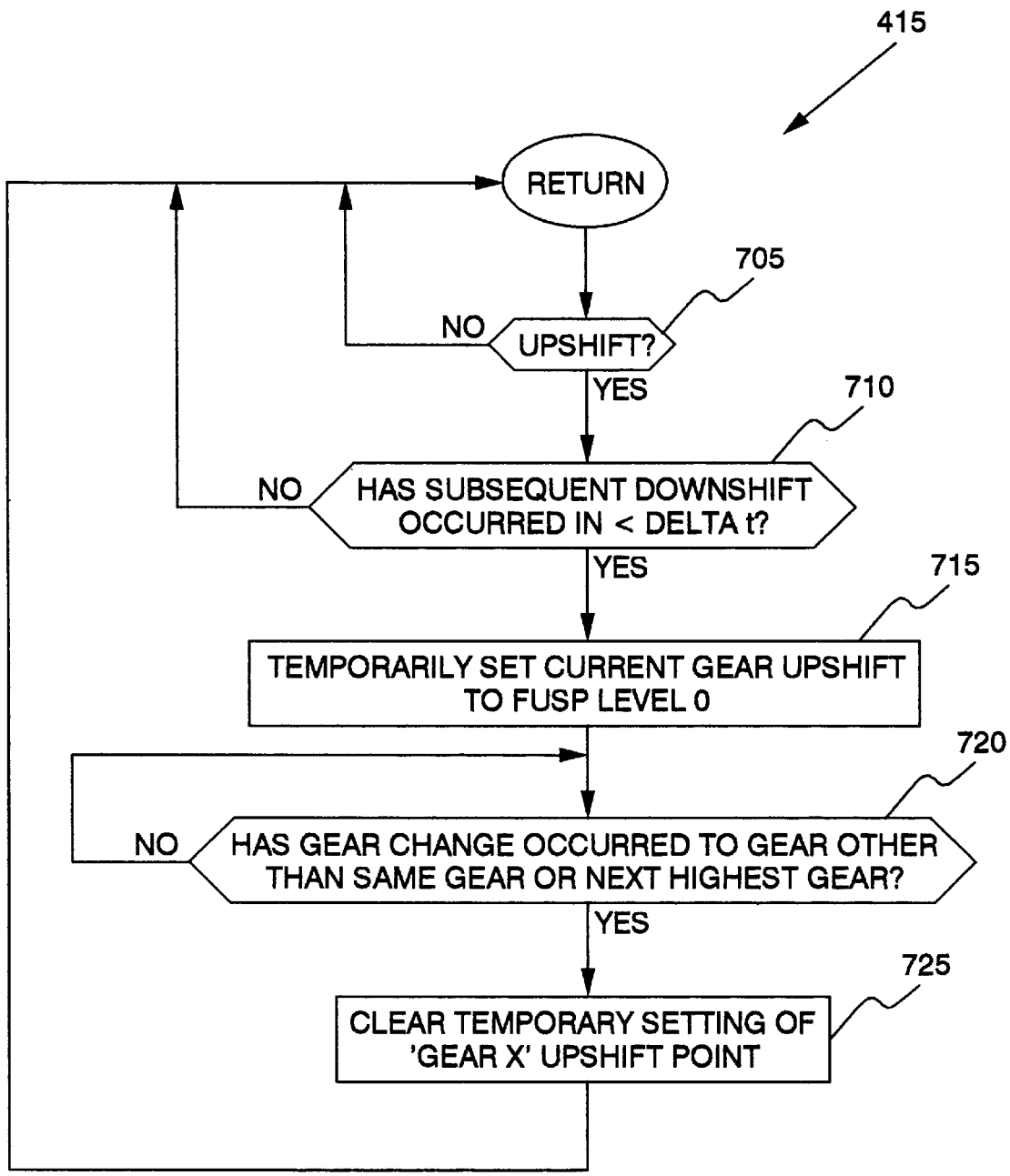

५,८०६,३७०

METHOD FOR MODIFYING THE SHIFTPOINTS OF AN AUTOMATIC TRANSMISSION

TECHNICAL FIELD

This invention relates generally to a method for modifying the preprogrammed shiftpoints of an automatic transmission and, more particularly, to modifying the preprogrammed shiftpoints in response to the operational history of the transmission.

BACKGROUND ART

Traditional automatic transmission controls effect power-shift gear ratio changes in accordance with a preselected shift map that is a function of transmission output speed. More particularly, each gear ratio has an associated upshift and downshift shiftpoint that is set at the factory. However, the factory upshift and downshift shiftpoints represent conservative values that are chosen to inhibit hunting or shift cycling, e.g., the transmission shifting back-and-forth between neighboring gear ratio pairs. Consequently, traditional automatic transmission controls use overly conservative shiftpoints which can limit the rimpull/speed performance of the vehicle when the driveline load limits vehicle speed at or near an upshift shiftpoint.

However, even transmission shiftpoints which are set somewhat conservatively, may result in hunting. This is shown in relation to Prior Art FIG. 8, where an example set of vehicle wheel power curves are illustrated. Note that the wheel power curves correspond to a pair of neighboring transmission gear ratios. This figure is used to illustrate how a fluctuating vehicle load may cause a hunting condition, even with moderately conservative shiftpoints. For example, a fluctuating load is shown as an finite number of load lines that form a "wedge". The wedge represents a vehicle that is traversing a grade that has an irregular slope or a varying surface. The width of the wedge corresponds to the inclination of the slope and/or the surface variability. Consequently, a hunting condition may occur if the shiftpoints (points 2 and 4) are within the wedge. Thus, not only do traditional transmission shiftpoints limit the vehicle's wheel power, but traditional transmission shiftpoints, may also result in hunting under some vehicle operating conditions.

The subject invention is directed towards a method that appropriately modifies the upshift shiftpoints over the operating life of the transmission to result in optimized transmission shifting to further improve vehicle performance, while minimizing any undesirable hunting characteristics.

DISCLOSURE OF THE INVENTION

In one aspect of the present invention, a method of effecting shifts in a vehicle is disclosed. The method modifies the transmission shiftpoints in response to the number of upshift successes and failures.

BRIEF DESCRIPTION OF THE DRAWINGS

For a better understanding of the present invention, reference may be made to the accompanying drawings in which:

FIG. 1 is a block diagram of an electronic control system of a vehicle drive train including a transmission;

FIG. 2 is a graph showing one example set of vehicle wheel power curves associated with a neighboring gear ratio pair;

FIG. 3 is a graph showing another example set of vehicle wheel power curves associated with a neighboring gear ratio pair;

FIG. 4 is a flow chart showing the program control of an executive subroutine;

FIG. 5 is a flow chart showing the program control of a control enabling subroutine;

FIG. 6 is a flow chart showing the program control of an adapt upshift subroutine;

FIG. 7 is a flow chart showing the program control of a temporary shiftpoint adjustment subroutine; and FIG. 8 is a prior art graph showing an example set of vehicle wheel power curves and a fluctuating load wedge.

BEST MODE FOR CARRYING OUT THE INVENTION

Referring now to the drawings, FIG. 1 illustrates an electronic control system of a power train 100 that includes an internal combustion engine 105, a multi-speed fluid operated power transmission 115, and a lower vehicle drive train 120. Additionally, a fluidic torque converter 110 may also be provided. The input 130 of the transmission 115 is connected to and driven by the engine 105 through a torque converter 110 that may be equipped with a lockup clutch 160. The output 135 of the transmission 115 is connected to and adapted to rotatably drive a shaft 145. The shaft 145 is in turn connected to and adapted to drive the lower vehicle drive train to propel the vehicle.

An operator initiates a desired shift via an operator shift handle 140, which produces a desired gear selection signal. An electronic control module 147 receives the gear selection signal and responsively controls the operation of the transmission via upshift and downshift solenoids 170. The electronic control module 147 may also receive various other input signals representative of vehicle system parameters, including an engine speed signal from an engine speed sensor 150, a transmission input speed signal from a transmission input speed sensor 155, and a transmission output speed signal from a transmission output speed sensor 165. The sensors are conventional electrical transducers typically of the magnetic speed pickup type.

The electronic control module selectively delivers control signals to the solenoids to initiate gear change operations. Actuation of one of the shift solenoids displaces a rotary selector valve (not shown) to a position corresponding to the new gear ratio. When the selector valve is repositioned, the transmission automatically disengages the old gear and engages the new gear, as is common in the art. The electronic control module is also electrically connected to the lockup clutch for controlling its engagement and disengagement during shifting in a well known manner.

Internally, the electronic control module 147 comprises a number of conventional devices including a microprocessor with an internal clock, volatile and non-volatile memory, and input/output devices. Stored in the memory are upshift and downshift shiftpoints that are preprogrammed at the factory. The microprocessor utilizes arithmetic units to control the transmission shifting in accordance with software programs. More specifically, the microprocessor modifies or adjusts the transmission shift points according to vehicle performance. Typically, the programs utilized by the microprocessor are stored in volatile and non-volatile memory or the like. The programs are discussed in relation to various flowcharts, shown on FIGS. 3–6.

Further, the electronic control module preferably contains sufficient memory to store information relating to many of the variables and values to be described. This stored information may then be used to provide the program control with a historical representation of the drivetrain performance. Consequently, the stored information may be used by the control as a baseline for a specific vehicle in which to make many of the calculations described herein.

Referring now to FIG. 2, an example set of vehicle wheel power curves corresponding to a pair of neighboring transmission gear ratios are shown. Point 1 refers to a theoretically ideal, nominal crossover shiftpoint (the value of which is typically unknown during vehicle operation); point 2 refers to a factory preprogrammed downshift shiftpoint; and point 3 refers to a factory preprogrammed upshift shiftpoint. Note that, point 3 is typically conservatively selected to minimize hunting.

Current state-of-the-art transmissions, shift from a lower gear ratio to a next higher gear ratio when the output speed of the transmission reaches the speed value represented by point 3, herein referred to as the upshift shiftpoint which, in this example, is set by the factory. However, when the vehicle is traveling up a grade, the associated driveline load may be similar to that shown by the dashed load line. In this example, the transmission will not achieve a shift to the next higher gear ratio because the required shift speed at point 3 cannot be reached due to the load line intersecting the wheel power curve at point 4. Consequently, the vehicle's travel speed will be that indicated by transmission output speed A; as opposed to the desirable transmission output speed B.

The present invention utilizes a predetermined crossover point to appropriately modify or adjust the factory or initial upshift shiftpoint associated with the current gear ratio to a value near the crossover point. As a result, the transmission is able to shift to the next higher gear ratio when the driveline load is near the crossover point. Advantageously, the present invention utilizes transmission operational history to determine when and how much the upshift shiftpoints associated with each gear ratio should be modified, while additionally minimizing repetitive hunting cycles.

Reference is now made to FIG. 3, which shows an example set of vehicle wheel power curves corresponding to a pair of neighboring transmission gear ratios are shown. Point 1 refers to a theoretically ideal, nominal crossover point; point 2 refers to a factory preprogrammed downshift shiftpoint; point 3 refers to an initial upshift shiftpoint that is analogous to the factory preprogrammed upshift shiftpoint (FUSP) that is referred to in FIG. 2, and points 4–7 refer to adapted upshift shiftpoints, i.e., preprogrammed upshift shiftpoints that are selected in accordance to the operating condition of the transmission and/or vehicle. The values of the adapted upshift shiftpoints are a function of the factory upshift shiftpoint and the crossover point. Note, the "Levels" depicted on FIG. 3 are in relation to Table 1 to be later discussed.

Advantageously, the present invention modifies or moves the actual upshift shiftpoint, for the current gear ratio, from the factory preprogrammed upshift shiftpoint to one of the adapted upshift shiftpoints to improve transmission operating performance.

The flowcharts illustrated in FIGS. 4 to 7 represent computer software logic for implementing the preferred embodiment of the present invention. The program depicted on the flowcharts is adapted to be utilized by any suitable microprocessor system.

FIGS. 4 to 7 are flowcharts representative of computer program instructions executed by the computer-based control unit of FIG. 1 in carrying out the shift control technique of the present invention.

FIG. 4 represents an executive or main loop program which directs the sequential execution of various subroutines. At block 405, a Control Enable subroutine determines whether the current operating conditions are sufficient to start or enable the subsequent subroutines of the adaptive shiftpoint control. At block 410, an Adapt Upshift subroutine modifies or adapts the upshift transmission shiftpoint of the current gear ratio. At block 415, a Temporary Shiftpoint Adjustment subroutine determines whether any temporary adjustments need be made to the adapted upshift shiftpoint in order to counter any hunting or shift cycling effects. Note that, blocks 410 and 415 represent separate shift strategies for each upshift shiftpoint for each gear ratio. Thus, modification or adjustment of a shiftpoint associated with one transmission gear ratio is independent to shiftpoint adjustments for other transmission gear ratios. Once the upshift shiftpoint for the current gear ratio has been modified or adapted, then this adapted upshift shiftpoint will be used for any subsequent upshifts from that gear ratio—until the adapted upshift shiftpoint is later modified.

The program control of the Control Enable subroutine will now be discussed in relation to FIG. 5. The program control determines whether several initial conditions are satisfied prior to enabling the adaptive shiftpoint control. The initial conditions are not limited to, but may include: whether the transmission oil temperature is greater than a predetermined value <505>, whether the vehicle is moving <510>, whether the transmission is engaged in at least first gear forward <515>, and whether the throttle is at maximum throttle <520>. If all these conditions occur, then the program control proceeds to the Adapt Upshift subroutine 410.

Reference is now made to Table 1.

ADAPTIVE UPSHFT PARAMETERS TABLE

| LEVEL | DESCRIPTION | VARIABLE ID | | | | | | |
|---|---|---|---|---|---|---|---|---|
| | | A | B | C | D | E | F | G |
| 0 | Very Conservative | 1 | 2 | 2 | 20 | 21 | 6 | 200 |
| 1 | Conservative | 1 | 4 | 2 | 40 | 41 | 6 | 200 |
| 2 | Approximately Neutral | 1 | 6 | 2 | 60 | 61 | 6 | 200 |
| 3 | Performance-Oriented | 1 | 8 | 2 | 80 | 81 | 6 | 200 |
| 4 | Max Performance | 1 | 10 | 2 | 100 | 101 | 6 | 200 |

Table 1 illustrates various parameter values to which the present invention utilizes in order to determine whether or not the upshift shiftpoint, will be modified. The table utilizes five separate levels, the lowest level or level 0 is considered to be an extremely conservative level while the highest level or level 4 is a maximum performance level. Each level in between represents a progressively more aggressive level from the extremely conservative level, level 0. Moreover, each level includes seven parameters, A, B, C, D, E, F and G. Parameters A and B form a parameter pair that is used to facilitate an "early failure" response, e.g., where soon after the upshift shiftpoint has been promoted to a higher level, upshift failures begin occurring. Parameters C and D form a parameter pair to facilitate a "longer failure" response, e.g., where well after the upshift shiftpoint has been promoted to a higher level, upshift failures begin occurring. Parameters E and G are used to determine performance enhancement e.g., whether the upshift shiftpoint will be promoted to a higher level. Finally, F is used in determining whether parameter E or G will be used to ascertain performance enhancement. The values shown in Table 1 are shown for illustrative purposes only and those skilled in the art will recognize that such values may vary according to the desired effect. Note, the values shown are determined from empirical data and mathematical modeling.

The Adapt Upshift subroutine 410 is responsible for modifying or adapting the current upshift shiftpoint to a desired value based on the above parameters. The program control for the Adapt Upshift subroutine 410 will now be described in relation to FIGS. 6A, B. Here, the program control adapts or modifies the upshift shiftpoint for the current gear ratio in order to optimize the transmission shifting performance. First, at block 605, the program determines whether an upshift has occurred. If an upshift has not occurred, then the control returns to the subroutine that called it. If an upshift has occurred, then the control transfers to block 610 to determine whether the a subsequent downshift has occurred within a predetermined time period. For example, the program determines whether a downshift has occurred within 10 seconds after the transmission has upshifted. If a downshift has not occurred within the predetermined time period, then the upshift is considered to be a success and a success counter is incremented at block 615. However, if a downshift has occurred within the predetermined time period, then the transmission may be starting a hunting cycle associated with the current level and a failure counter is incremented at block 620. Thus, a failure is defined as the transmission downshifting within the predetermined time period after an upshift.

Control then passes to block 625 where the program determines whether a LEVEL 4 FLAG has been set. If the LEVEL 4 FLAG has not been set, then the control passes to block 630 where the program determines whether the upshift shiftpoint level should be changed to a "more conservative" setting. More particularly, the program determines whether the number of failures is greater than parameter A and the number of successes is less than or equal to parameter B for the current level. If these conditions exist, then an early failure has occurred. Thus, the current or adapted upshift shiftpoint, AUSP, is set to the next lowest level at block 640. Similarly, at block 635, the program determines whether the number of failures is greater than parameter C and the number of successes is less than or equal to parameter D. If these conditions exist, then a longer term failure is said to have occurred and the adapted upshift shiftpoint, AUSP is set to the next lowest level, as per block 640. Assuming that the adapted upshift shiftpoint, AUSP has been demoted or set to the next lowest level, then the program resets both the success and failure counters to zero and clears the LEVEL 4 FLAG in accordance with block 645. Control then proceeds to block 650 where an adaptation level counter is incremented for the current gear pair. The adaptation level counter represents the number of times that the current adapted upshift shiftpoint level has been continuously promoted to the next higher level and demoted from the next higher level. In other words, the adaptation level counter indicates whether the adapted upshift shiftpoint associated with the current adapted upshift shiftpoint level has been consistently "bouncing" back-and-forth between two successive levels. Thus, blocks 640 and 645 are all responsible for demoting the adaptive upshift shiftpoint, AUSP.

If early or long term failure has not occurred, then the adaptive upshift shiftpoint AUSP may be modified to a higher performance setting. Reference is now made to FIG. 6B at block 655 where the program determines whether the adaptation level counter is greater than or equal to parameter F. If the adaptation level counter is greater than or equal to parameter F, then parameter G will be used to determine whether the adapted upshift shiftpoint will be promoted. However, if the adaptation level counter is less than parameter F, then parameter E will be used to determine whether the adapted upshift shiftpoint will be promoted. If the adaptation level counter is less than parameter F, then the control transfers to block 660 where the program determines whether the number of successes is greater than or equal to parameter E and the number of failures is less than or equal to parameter C. If so, then the adaptive upshift shiftpoint AUSP is promoted to the next higher level in accordance with block 665. Otherwise the Adapt Upshift subroutine returns to the subroutine that called it.

If the adaptation level counter is greater than parameter F, then the control transfers to block 670 where the program determines whether the number of successes is greater than or equal to parameter G and the number of failures is less than or equal to parameter C. If this relationship is not satisfied, then the Adapt Upshift subroutine returns to the subroutine which called it. However, if the relationship of block 670 is satisfied, then the adaptive upshift shiftpoint AUSP is promoted to the next highest level, as provided in block 665. However, if adapted upshift shiftpoint is already set to the highest level, e.g. level 4, then the LEVEL 4 FLAG is set. Accordingly, the success and failure counters are reset back to zero as per block 675 and the adaptation level counter is incremented according to block 680. Thus, blocks 655–680 are responsible for promoting the adapted upshift shiftpoint AUSP.

Reference is now made to FIG. 7, which illustrates the program control for the Temporary Shiftpoint Adjustment subroutine 415. For example, the program control of the Temporary Shiftpoint Adjustment subroutine 415 determines if the transmission is hunting or cycling back and forth between a neighboring gear pair; and if so, the control temporarily adjusts the adapted upshift shiftpoint AUSP to stop the shift cycling condition.

First, at block 705, the program determines whether an upshift has occurred. If so, the program determines whether a downshift has occurred within a predetermined time period as shown in block 710. For example, the program determines whether a downshift has occurred within 10 seconds. If a downshift has occurred within a predetermined time period, then the program temporarily sets upshift shiftpoint, AUSP to the factory upshift shiftpoint which corresponds to level 0. This level represents the most conservative level to which the transmission will operate. At this level, the transmission will likely not exhibit any hunting characteristics. The program control then proceeds to block 720 where the program determines whether a gear change has occurred to a gear other than the current gear or the next highest gear. In other words, the program determines whether or not the transmission has been cycling from the current gear to the next highest gear, or whether the transmission has actually shifted to a gear beyond the next highest gear or below the current gear. In the later two cases, then the control proceeds to block 725 where the temporary setting for adapted upshift shiftpoint of the current gear is cleared.

Thus, the temporary adjustment to the adapted upshift shiftpoint is terminated at such time when the transmission has reached a gear ratio above or below the current gear ratio pair where the shift cycling was occurring. Note that, the Temporary Shiftpoint Adjustment subroutine operates simultaneous to the operation of the Adapt Upshift subroutine. Moreover, because the Temporary Shiftpoint Adjustment subroutine has precedence to the Adapt Upshift subroutine, the temporary adjustment of the upshift shiftpoint dominates until the temporary adjustment has been cleared.

INDUSTRIAL APPLICABILITY

As described above, the present invention advantageously modifies the transmission shiftpoints to better utilize the available wheel power of the vehicle. More specifically, the present invention "positions" the upshift shiftpoint closer to the ideal "crossover" point to improve vehicle performance. Additionally, the shiftpoints are modified in a manner to minimize hunting or shift cycling problems. Thus, the present invention modifies the shiftpoints enough to better utilize the available wheel power, yet not too much to cause undesirable shift cycling conditions. Accordingly, the present invention is applicable to such vehicle transmissions that are associated with various types of working vehicles, including: on-highway or off-highway trucks, wheel loaders, or the like.

With reference to Table 1, assume that the current upshift shiftpoint for the current gear ratio is set to level 2. After a predetermined number of shifts for each gear pair, the control will then adapt or modify the upshift shiftpoint of each gear pair in response to the number of shifting successes and failures for the particular gear pair. As described above, a success is defined as a shift from one gear to the next higher gear—without having a subsequent downshift within a predetermined time period. Thus, if a number of successful shifts has occurred for the associated gear pair, then the upshift shiftpoint for the associated gear pair is then promoted to the next higher level—in this example, level 3. This will continue until the maximum performance level is reached, e.g., level 4. If however, a predetermined number of failed shifts have occurred at the corresponding level, then the upshift shiftpoint associated with the particular gear pair is demoted to the next lower level, which will potentially continue until the most conservative level is reached, e.g., level 0.

Advantageously, the present invention evaluates the number of upshift failures for each gear ratio and compares the number of upshift failures to a set of parameters that represent an early or long term failure condition. In this way, the upshift shiftpoint for each gear pair is adapted or modified based on the current operating conditions of the transmission or vehicle. Thus, the upshift shiftpoints provide for the transmission to shift in a manner that provides for an optimized combination of improved performance and few hunting situations. Moreover, the present invention provides for two vehicles with similar performance characteristics to adapt the upshift shiftpoint of each gear ratio to differing load applications, such as one with constant grades or one with a fluctuating load wedge (as described in FIG. 8). Therefore, the present invention optimizes the upshift shiftpoints according to the particular vehicle application and balances the shiftpoint level between levels of high performance and low hunting characteristics.

Note that the above illustration pertains to one of many examples of adapting the upshift shiftpoint. Those well skilled in the art will recognize that the control will produce a different adapted upshift shiftpoint profile in response to different transmission operating parameter values.

Thus, while the present invention has been particularly shown and described with reference to the preferred embodiment above, it will be understood by those skilled in the art that various additional embodiments may be contemplated without departing from the spirit and scope of the present invention.

We claim:

1. A method of effecting transmission shifts in a vehicle having an automatic transmission including a plurality of transmission gear ratios and a transmission actuator for automatically establishing a particular gear ratio in response to a transmission control signal, the method comprising the steps of:

storing a plurality of upshift shiftpoints for each transmission gear ratio;

storing a downshift shiftpoint for each transmission gear ratio;

determining the number of upshift successes and failures; and selecting one of the plurality of upshift shiftpoints based on the number of upshift successes and failures.

2. A method, as set forth in claim 1, wherein the step of determining the number of upshift successes and failures includes the steps of determining whether a subsequent downshift has occurred within a predetermined time period.

3. A method, as set forth in claim 2, wherein the values of the stored upshift shiftpoints are a function of an initial upshift shiftpoint and a crossover point, the stored upshift shiftpoint values progressively increase from the initial upshift shiftpoint to the crossover point.

4. A method, as set forth in claim 3, wherein each stored upshift shiftpoint corresponds to an upshift level, each upshift level corresponds to a plurality of parameter pairs, and each parameter pair corresponds to a number of upshift successes and failures.

5. A method, as set forth in claim 4, including the step of comparing the number of upshift successes and failures with the plurality of parameter pairs for the current upshift level and selecting one of the plurality of stored upshift shiftpoint based on the comparison.

6. A method, as set forth in claim 5, wherein the plurality of parameter pairs represent early occurring and later occurring upshift failures.

7. A method, as set forth in claim 6, including the steps of:

initially assigning the current upshift shiftpoint to one of the plurality of stored upshift shiftpoints that corresponds to an upshift level that includes a factory upshift shiftpoint;

modifying the current upshift shiftpoint to one of the plurality of stored upshift shiftpoints that corresponds to the next higher level in response to recording a predetermined number of upshift successes; or alternatively, modifying the current upshift shiftpoint to one of the plurality of stored upshift shiftpoints that corresponds to the next lower level in response to recording a predetermined number of upshift failures.

8. A method, as set forth in claim 7, including the steps of determining whether a shift cycling condition is occurring and temporarily modifying the current upshift shiftpoint to one of the plurality of stored upshift shiftpoints that corresponds to the lowest level in response to the shift cycling condition.

9. A method of effecting transmission shifts in a vehicle having an automatic transmission including a plurality of transmission gear ratios and a transmission actuator for automatically establishing a particular gear ratio in response to a transmission control signal, the method comprising the steps of:

storing a plurality of upshift shiftpoints for each transmission gear ratio;

storing a downshift shiftpoint for each transmission gear ratio;

determining the number of upshift successes and failures;

selecting one of the plurality of upshift shiftpoints based on the number of upshift successes and failures, wherein each stored upshift shiftpoint corresponds to an upshift level, each upshift level corresponds to a plurality of parameter pairs, and each parameter pair corresponds to a number of upshift successes and failures; and comparing the number of upshift successes and failures with the plurality of parameter pairs for the current upshift level and selecting one of the plurality of stored upshift shiftpoint based on the comparison.

10. A method, as set forth in claim 9, wherein the step of determining the number of upshift successes and failures includes the steps of determining whether a subsequent downshift has occurred within a predetermined time period.

11. A method, as set forth in claim 10, wherein the values of the stored upshift shiftpoints are a function of an initial upshift shiftpoint and a crossover point, the stored upshift shiftpoint values progressively increase from the initial upshift shiftpoint to the crossover point.

12. A method, as set forth in claim 11, including the step of comparing the number of upshift successes and failures with the plurality of parameter pairs for the current upshift level and selecting one of the plurality of stored upshift shiftpoint based on the comparison.

13. A method, as set forth in claim 12, wherein the plurality of parameter pairs represent early occurring and later occurring upshift failures.

14. A method of effecting transmission shifts in a vehicle having an automatic transmission including a plurality of transmission gear ratios and a transmission actuator for automatically establishing a particular gear ratio in response to a transmission control signal, the method comprising the steps of:

storing a plurality of upshift shiftpoints for each transmission gear ratio, wherein each stored upshift shiftpoint corresponds to an upshift level;

initially assigning a current upshift shiftpoint to one of the plurality of stored upshift shiftpoints;

storing a downshift shiftpoint for each transmission gear ratio;

determining the number of upshift successes and failures; and re-assigning the current upshift shiftpoint to one of the plurality of stored upshift shiftpoints that corresponds to the next higher level in response to recording a predetermined number of upshift successes; or alternatively, re-assigning the current upshift shiftpoint to one of the plurality of stored upshift shiftpoints that corresponds to the next lower level in response to recording a predetermined number of upshift failures.

15. A method, as set forth in claim 14, including the steps of determining whether a shift cycling condition is occurring and temporarily re-assigning the current upshift shiftpoint to one of the plurality of stored upshift shiftpoints that corresponds to the lowest level in response to the shift cycling condition.

* * * * *